(12) United States Patent
Fujisaki

(10) Patent No.: US 7,679,836 B2
(45) Date of Patent: Mar. 16, 2010

(54) ZOOM LENS SYSTEM AND IMAGE PICKUP APPARATUS EQUIPPED WITH THE SAME

(75) Inventor: Toyokatsu Fujisaki, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 83 days.

(21) Appl. No.: 12/174,554

(22) Filed: Jul. 16, 2008

(65) Prior Publication Data

US 2009/0021844 A1    Jan. 22, 2009

(30) Foreign Application Priority Data

Jul. 17, 2007    (JP) .............................. 2007-185639

(51) Int. Cl.
*G02B 15/14*    (2006.01)
(52) U.S. Cl. ...................... 359/687; 359/686
(58) Field of Classification Search .................. 359/684, 359/685, 686, 687
See application file for complete search history.

(56) References Cited

U.S. PATENT DOCUMENTS

| | | | |
|---|---|---|---|
| 5,963,378 A | 10/1999 | Tochigi | |
| 6,166,864 A | 12/2000 | Horiuchi | |
| 7,088,522 B2 * | 8/2006 | Hamano | 359/687 |
| 7,167,320 B2 | 1/2007 | Ohashi | |
| 7,471,460 B2 * | 12/2008 | Saruwatari | 359/687 |
| 2009/0251797 A1 * | 10/2009 | Saruwatari | 359/687 |

FOREIGN PATENT DOCUMENTS

JP    08-050244    2/1996

* cited by examiner

*Primary Examiner*—David N Spector
(74) *Attorney, Agent, or Firm*—Canon USA Inc IP Div

(57) ABSTRACT

A zoom lens system that performs zooming by moving lens units includes, in the following order from an object side towards image side, a first lens unit having positive refractive power and movable along a locus convex towards the image side during zooming from a wide-angle end to telephoto end, a second lens unit having negative refractive power, an aperture stop movable independently of the lens units, and third and fourth lens units having positive refractive powers. The following conditions are satisfied:

$$-0.6 < f2/f3 < -0.4$$

$$-0.5 < MS/M3 < 0.9$$

where MS and M3 respectively indicate moving distances of the aperture stop and third lens unit along an optical axis, and f2 and f3 respectively indicate focal lengths of the second and third lens units, each moving distance being a positive sign if directed towards the image side or a negative sign if directed towards the object side.

11 Claims, 17 Drawing Sheets

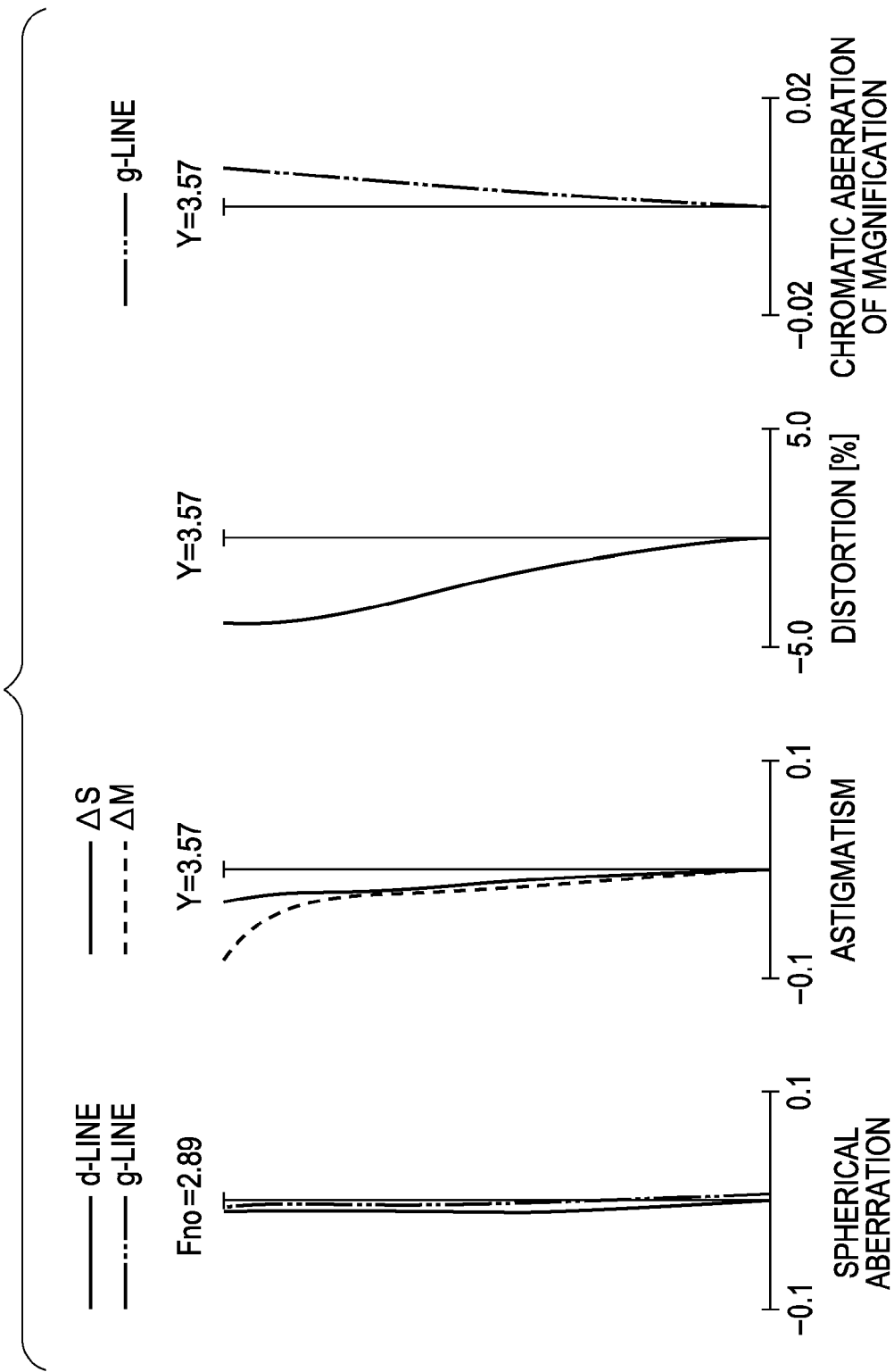

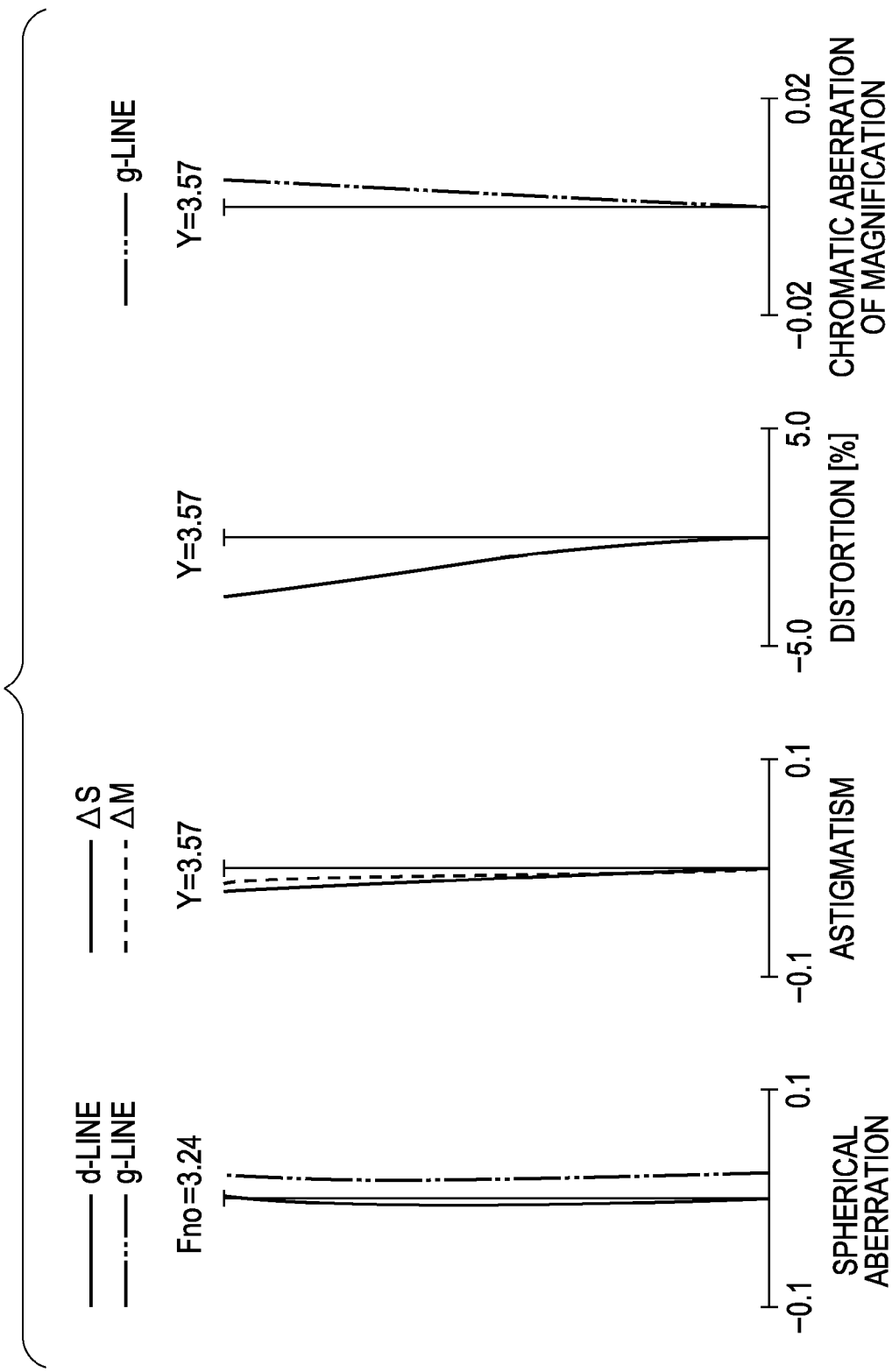

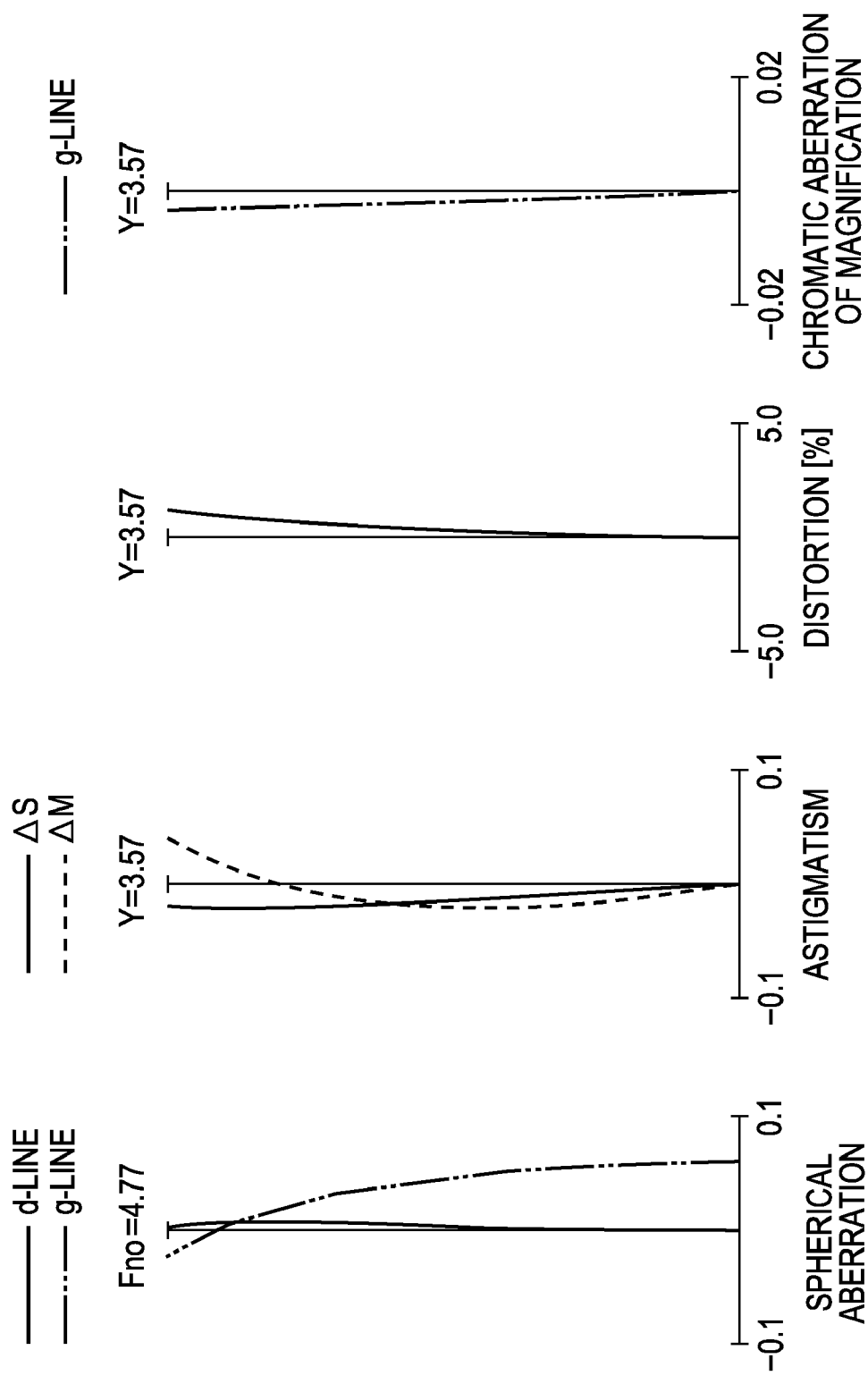

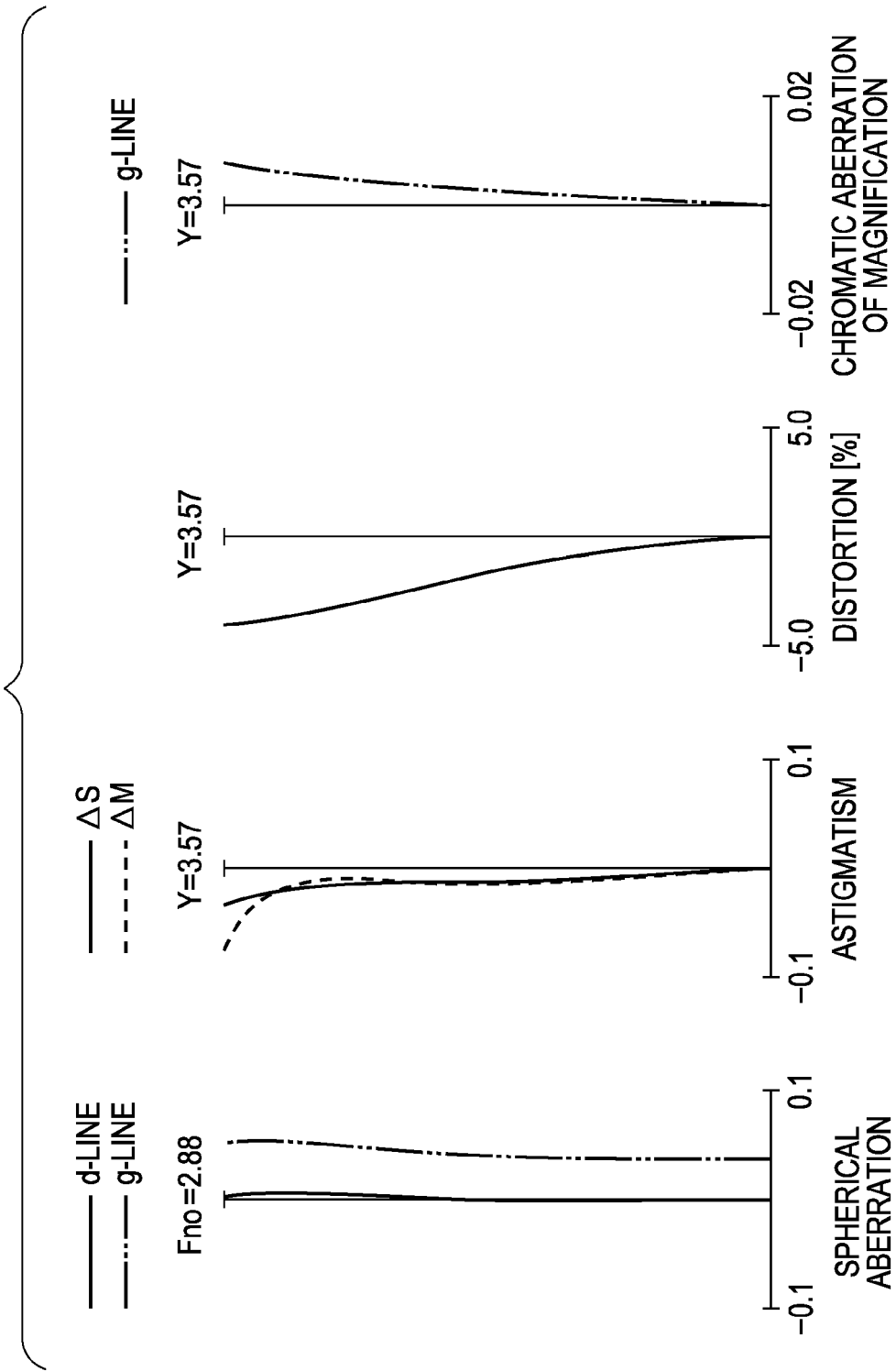

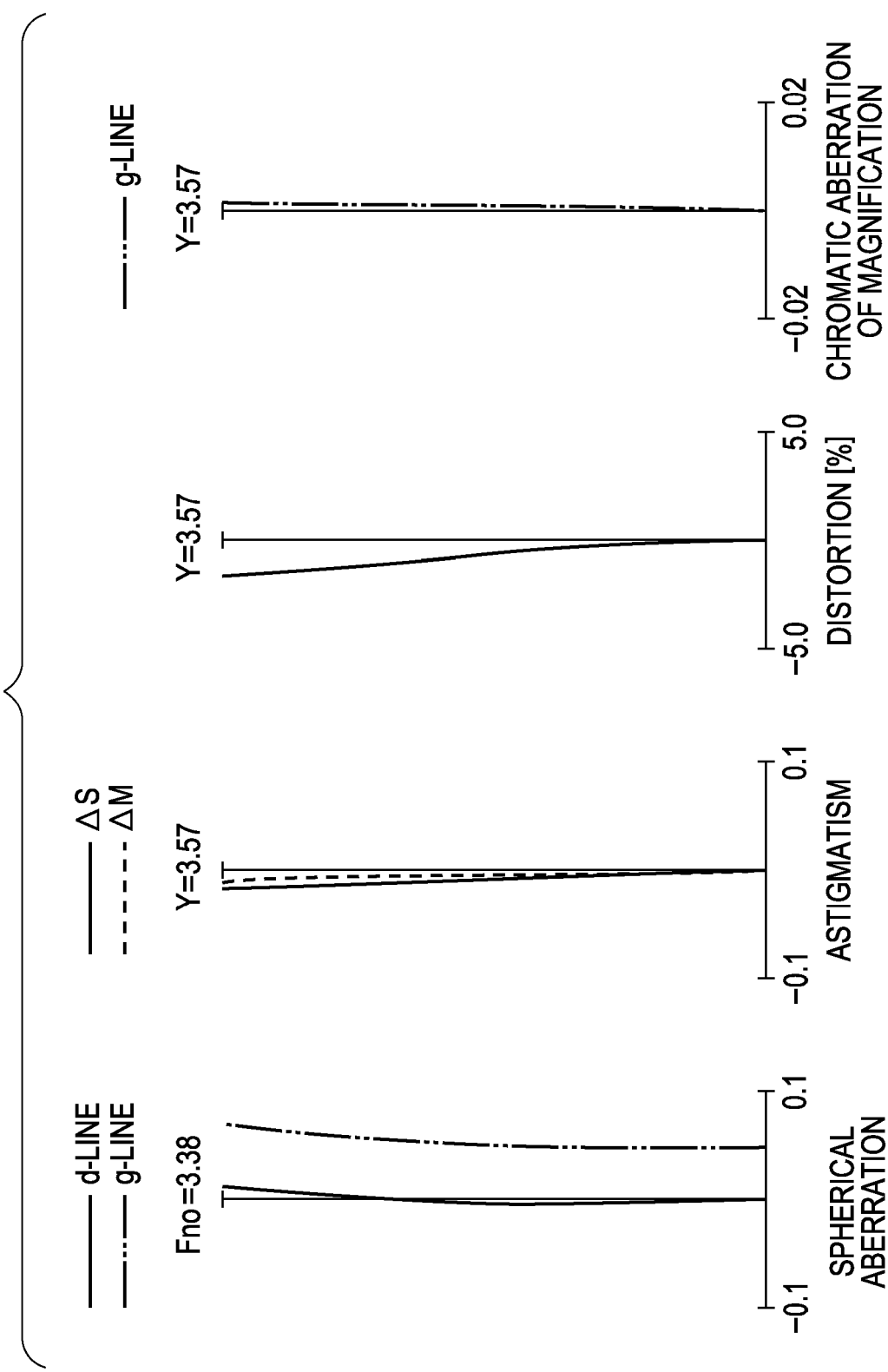

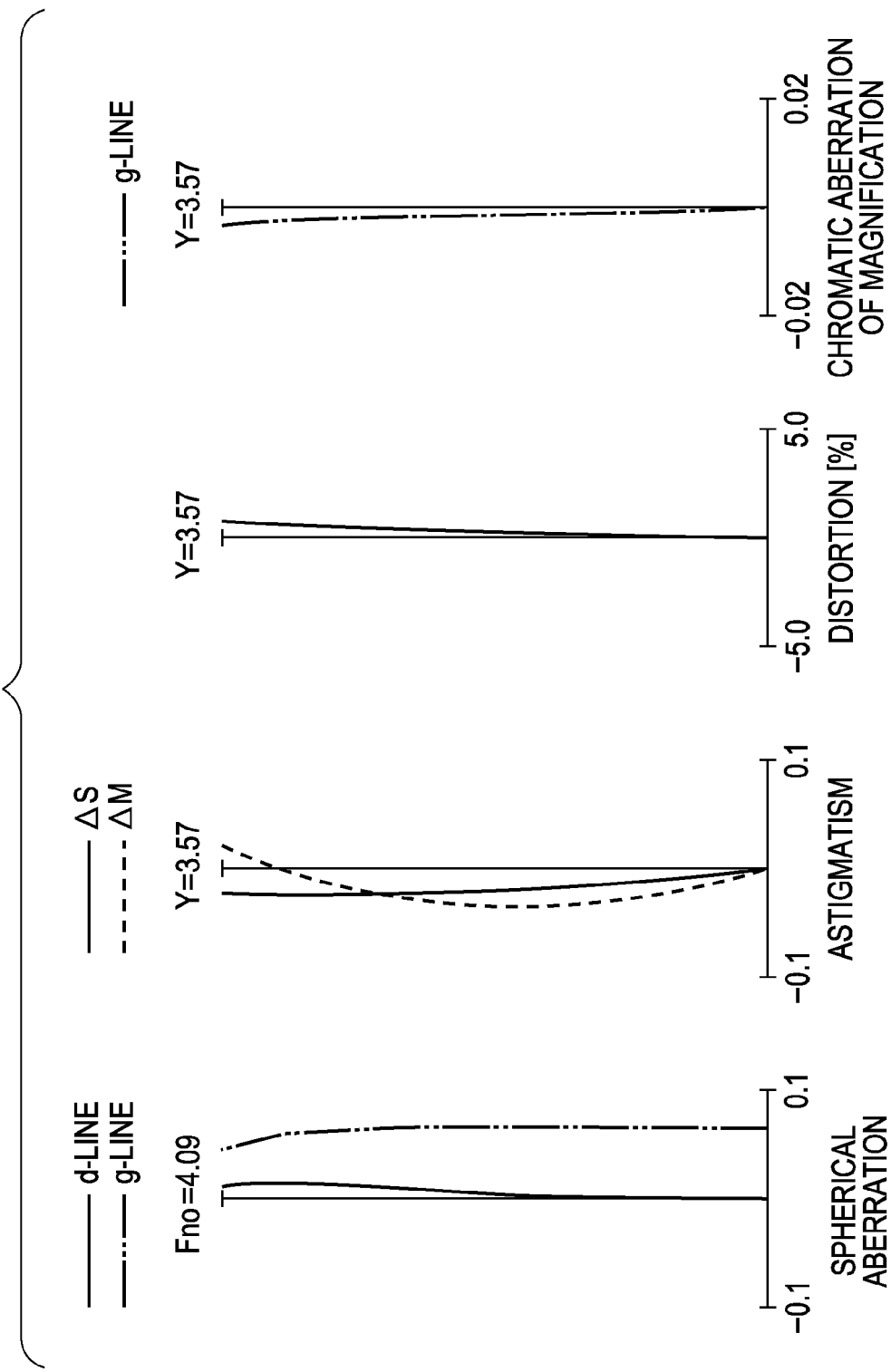

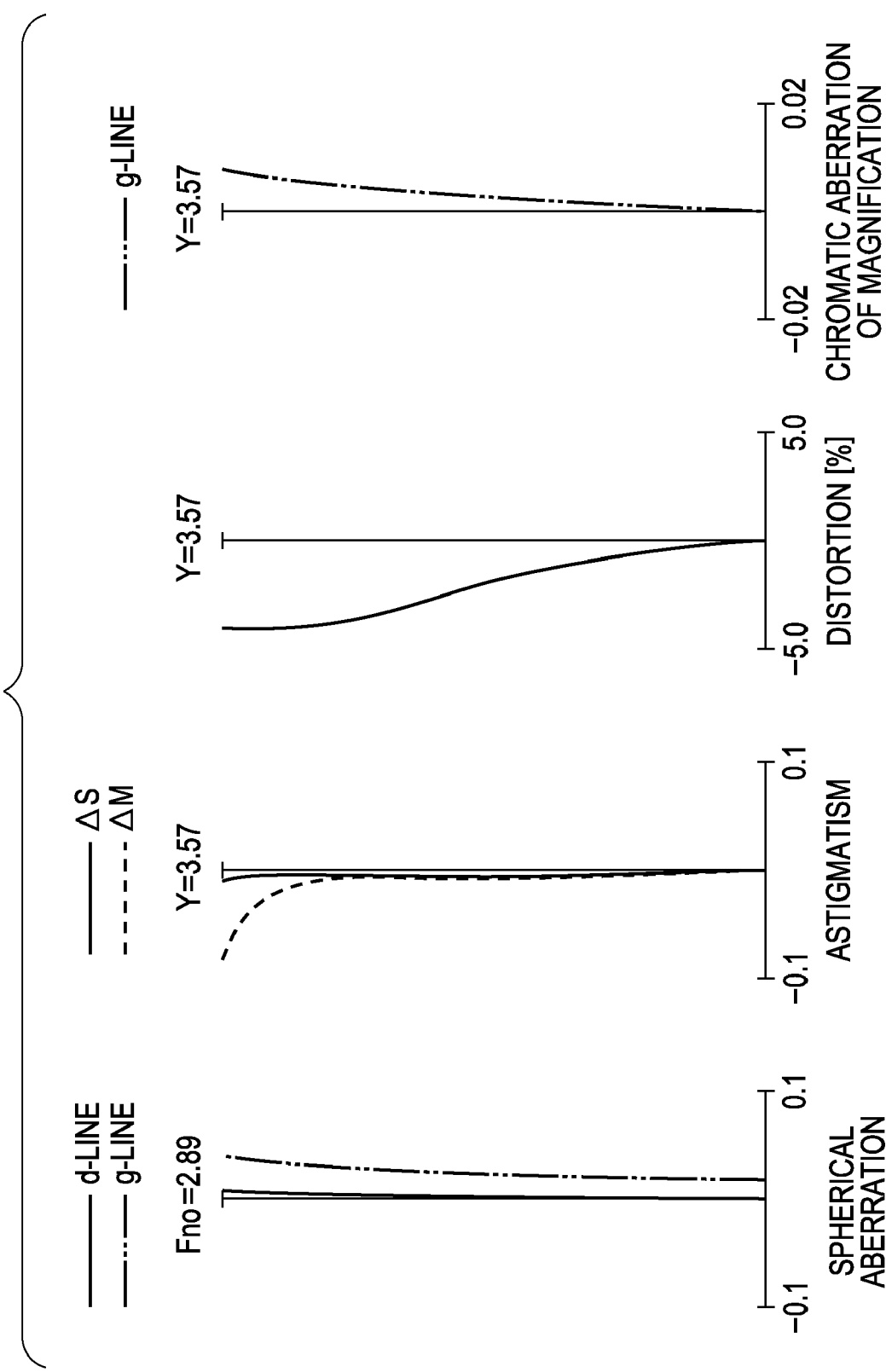

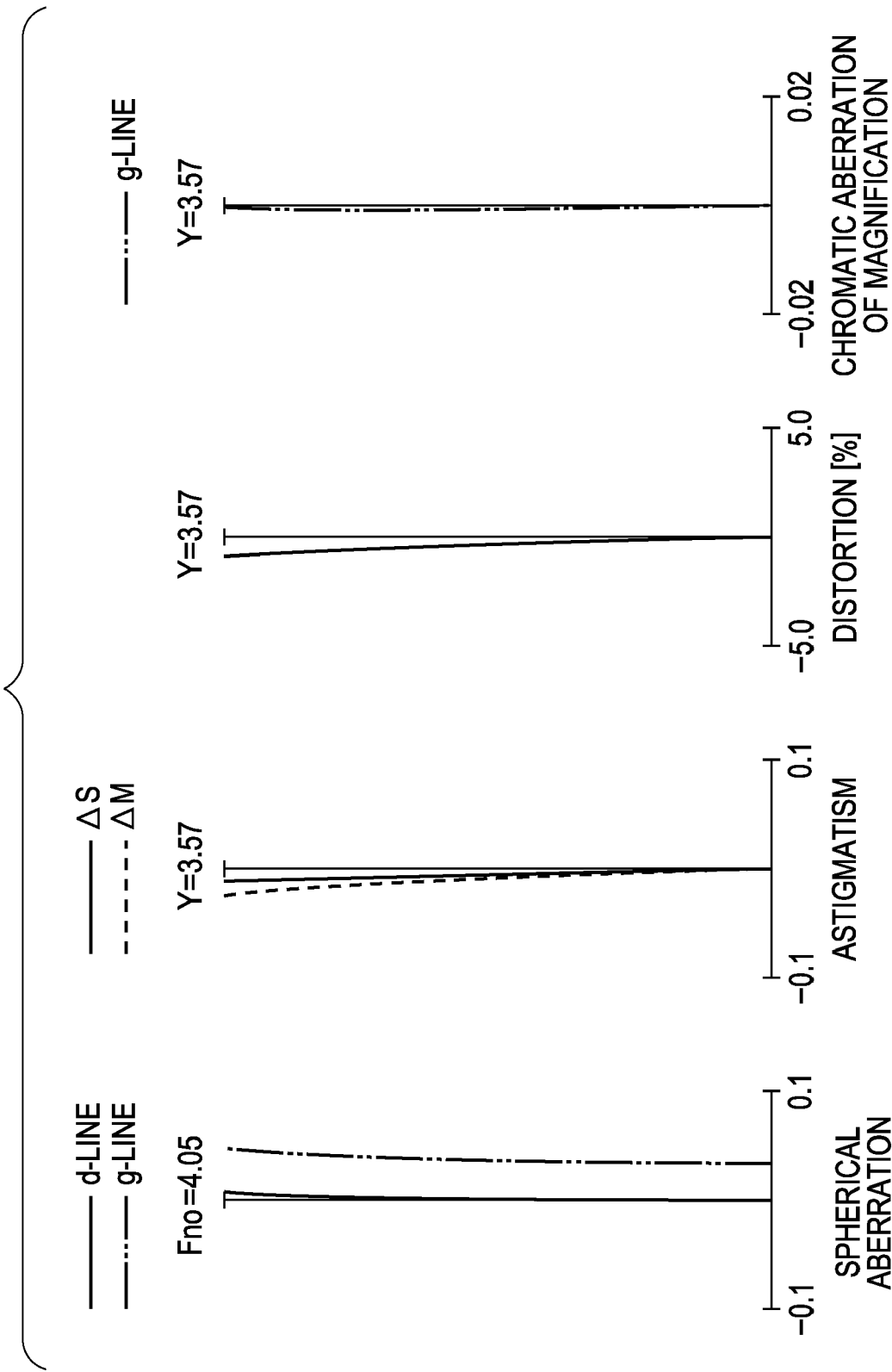

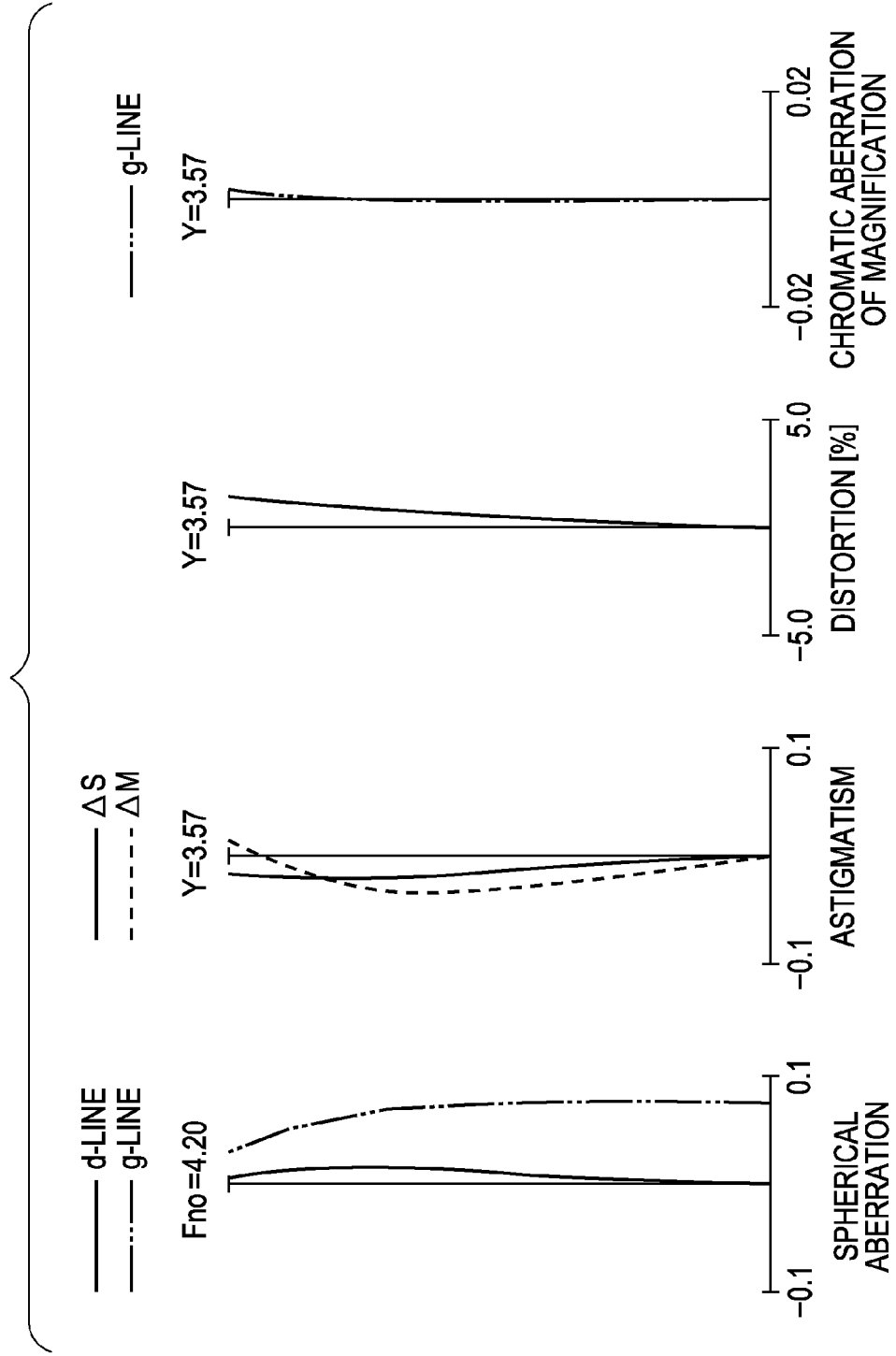

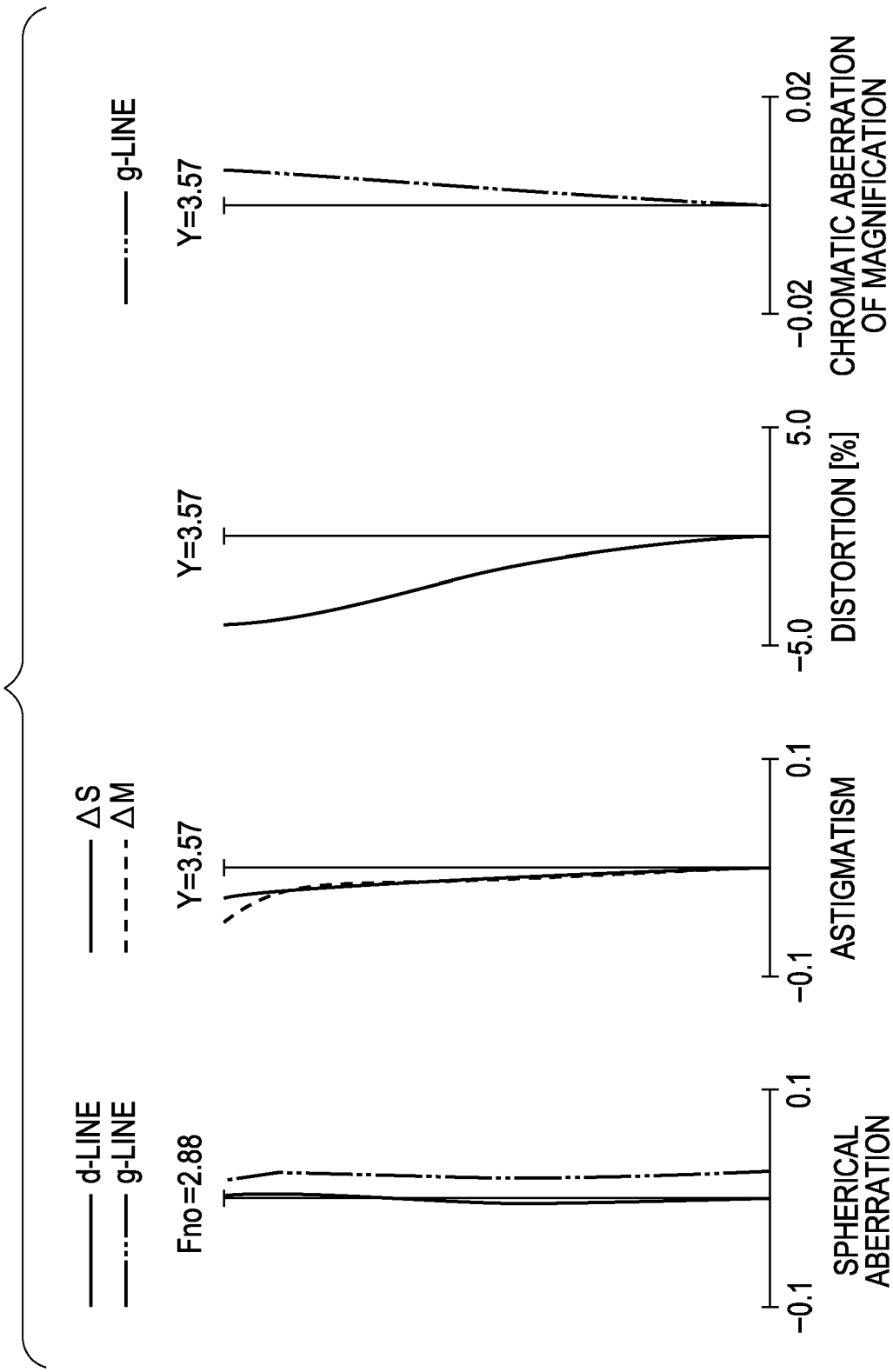

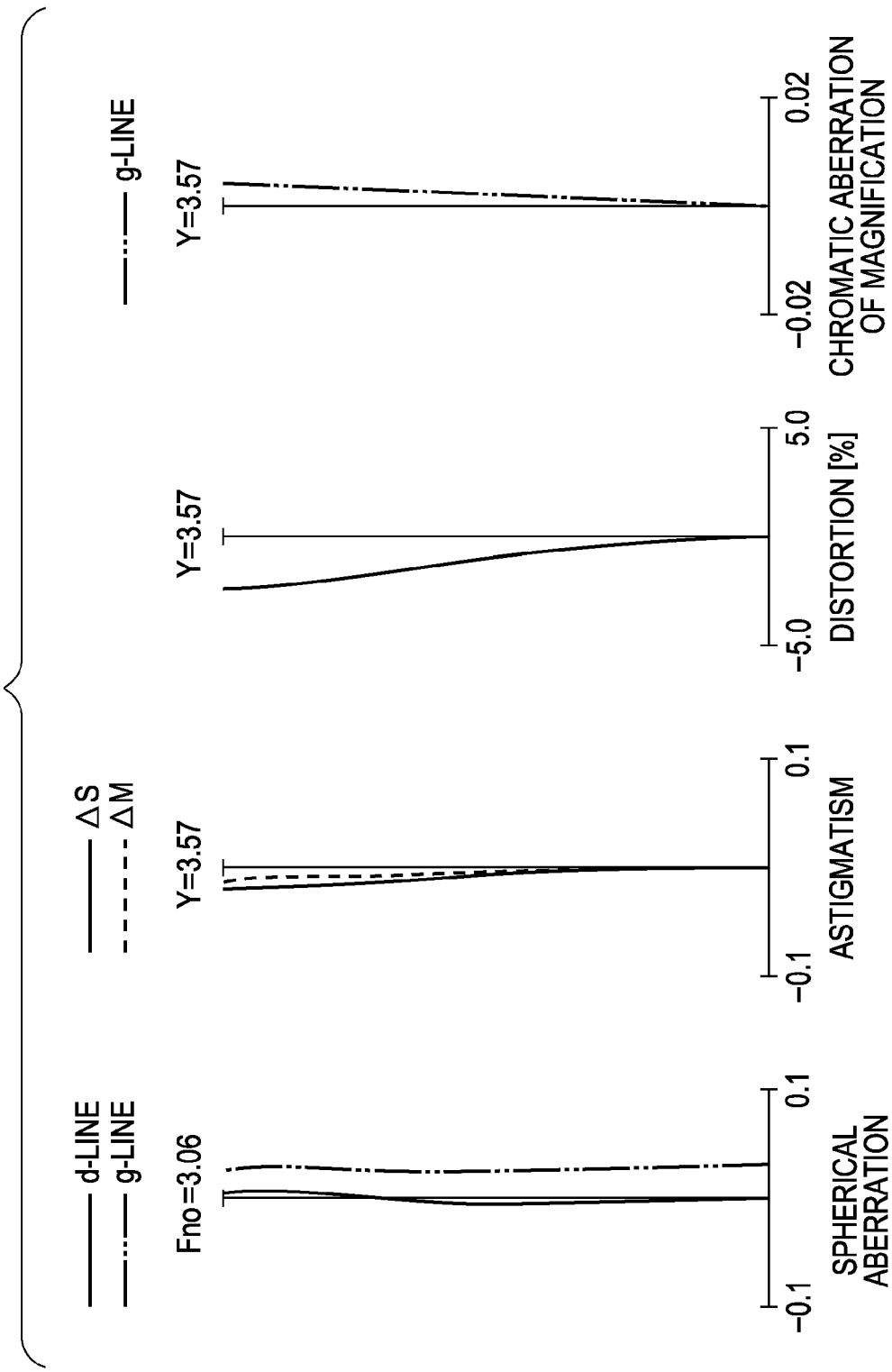

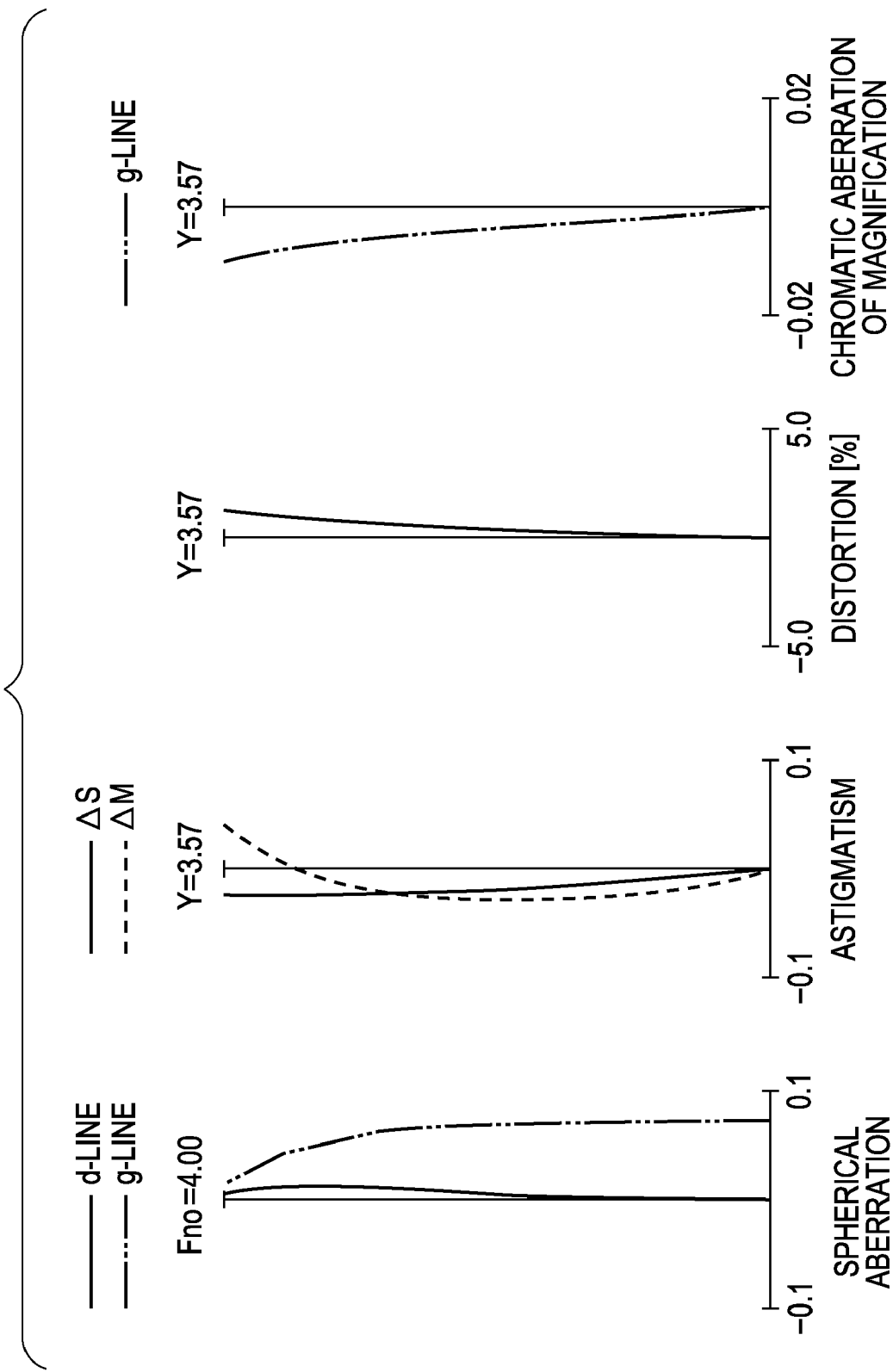

ZOOM LENS SYSTEM AND IMAGE PICKUP APPARATUS EQUIPPED WITH THE SAME

BACKGROUND OF THE INVENTION

1. Field of the Invention

The present invention relates to zoom lens systems and image pickup apparatuses equipped with such zoom lens systems. In particular, the present invention relates to a zoom lens system that is applicable to, for example, a video camera, an electronic still camera, or a silver-halide photographic camera.

2. Description of the Related Art

In recent years, image pickup apparatuses containing solid-state image pickup elements and used as video cameras, digital still cameras, broadcasting cameras, film cameras that use silver-halide films, etc., have become smaller and been given increased functionality. Accordingly, there are demands for compact, high-definition zoom lens systems with reduced overall length to be used as image-taking optical systems in such image pickup apparatuses.

As a zoom lens system that meets such demands, a so-called rear-focus zoom lens system is known, which performs focusing by moving lens units other than a first lens unit located proximate to the object side.

Generally, in comparison to a zoom lens system that performs focusing by moving the first lens unit, a rear-focus zoom lens system has a first lens unit with a smaller effective diameter, which easily allows for compactness of the entire lens system. Moreover, in a rear-focus zoom lens system, close-range shooting, or extra-close-range shooting in particular, can be readily performed. In addition, the use of small, lightweight lens units in a rear-focus zoom lens system reduces the driving force required for moving the lens units so as to allow for quick focusing.

A known example of a rear-focus zoom lens system is a four-unit zoom lens system that includes a first lens unit having positive refractive power, a second lens unit having negative refractive power, a third lens unit having positive refractive power, and a fourth lens unit having positive refractive power, which are arranged in that order from the object side towards the image side.

U.S. Pat. No. 5,963,378 and U.S. Pat. No. 6,166,864 disclose examples of a rear-focus four-unit zoom lens system that performs zooming by moving the second lens unit while performing focusing and correction of an image plane aberration occurring due to zooming by moving the fourth lens unit.

Other examples of a four-unit zoom lens system are known from Japanese Patent Laid-Open No. 08-050244 and U.S. Pat. No. 7,088,522. In these examples, when the zoom lens system performs zooming, the zoom lens system moves the lens units while also moving an aperture stop independently of the lens units, the aperture stop being disposed between the second lens unit and the third lens unit.

When the zoom lens system disclosed in Japanese Patent Laid-Open No. 08-050244 performs zooming from a wide-angle end to a telephoto end, the aperture stop is moved independently of the lens units along a locus convex towards the object side. For focusing, the zoom lens system moves the fourth lens unit. This zoom lens system has a zoom ratio of about 12.5.

On the other hand, the zoom lens system disclosed in U.S. Pat. No. 7,088,522 moves the aperture stop independently of the lens units towards the image side when performing zooming from a wide-angle end to a telephoto end, and has a zoom ratio of about 12 to 13.5.

In the case where the aperture stop is disposed near the third lens unit in the four-unit zoom lens systems described above, even if the zoom lens system is configured to distribute a sufficient quantity of light to the peripheral region of the screen, the light quantity decreases drastically from an 80% peripheral range of the screen. This decrease in the light quantity is conspicuous even under the same marginal illumination.

In contrast, U.S. Pat. No. 7,167,320 discloses a four-unit zoom lens system in which an aperture stop disposed on the object side of the third lens unit is moved independently of the third lens unit. In this four-unit zoom lens system, the aperture stop is moved by an appropriate distance so as to minimize a drastic fall-off in light quantity in the peripheral region of the screen when the zoom lens system is at the wide-angle end or at zoom positions near the wide-angle end.

In the zoom lens system according to U.S. Pat. No. 7,167,320, the first lens unit and the third lens unit are moved monotonously towards the object side when the zoom lens system performs zooming from the wide-angle end to the telephoto end. The aperture stop is configured to be moved independently of the lens units towards the object side. Accordingly, U.S. Pat. No. 7,167,320 discloses a zoom lens system with a zoom ratio of about 4.5 to 7, in which the off-axis performance is properly corrected at each zoom position.

Generally, in order to obtain a high zoom ratio in a zoom lens system while still achieving compactness thereof, the refractive powers of the lens units included in the zoom lens system may be increased and the number of lens elements may be reduced. However, a zoom lens system with such a configuration can be problematic in that the lens elements will have greater lens thicknesses in accordance with the increase in the refractive powers of the lens surfaces. For this reason, the length of the lens system cannot be sufficiently reduced, and at the same time, the zoom lens system will have difficulty in correcting the aberrations.

In addition, if a camera is to be given a collapsible function where the lens units can be collapsed and stored when the camera is not in use, increasing the refractive powers of the lens units will inevitably cause mechanical errors, such as tilting of the lens elements and the lens units.

In this case, if the sensitivity of the lens elements and the lens units is high, the optical performance can deteriorate and an image blur can occur during zooming. Therefore, in order to maintain high optical performance, it is desirable to minimize the sensitivity of the lens elements and the lens units.

In the aforementioned four-unit zoom lens systems, the light quantity tends to drop drastically in the peripheral region of the screen when the zoom lens system is at the wide-angle end or at zoom positions near the wide-angle end, thus lowering the image quality in the peripheral region of the screen.

Furthermore, in the aforementioned four-unit zoom lens systems, it is important to properly move the aperture stop during zooming to maintain a high image quality. If the movement condition of the aperture stop is not proper, it becomes significantly difficult to minimize the drastic fall-off of light quantity in the peripheral region of the screen.

To achieve high optical performance in the aforementioned four-unit zoom lens systems while obtaining a high zoom ratio and achieving compactness of the entire lens system, it is important to appropriately set the zoom type, the refractive powers of the lens units, and the movement conditions of the lens units and the aperture stop required for zooming.

Especially in the aforementioned four-unit zoom lens systems, it is extremely difficult to achieve high optical performance over the entire zoom range and to obtain a high zoom ratio at the same time if the refractive powers of the second lens unit and the third lens unit and the moving distances of the aperture stop and the third lens unit for zooming are not set properly.

SUMMARY OF THE INVENTION

The present invention provides a zoom lens system that includes a first lens unit having positive refractive power, a second lens unit having negative refractive power, an aperture stop, a third lens unit having positive refractive power, and a fourth lens unit having positive refractive power, which are arranged in that order from an object side towards an image side. The zoom lens system is configured to perform zooming by moving the first through fourth lens units. The first lens unit is moved along a locus convex towards the image side when the zoom lens system performs zooming from a wide-angle end to a telephoto end. The aperture stop is movable independently of the first through fourth lens units. In the zoom lens system, the following conditions are satisfied:

$$-0.6 < f2/f3 < -0.4$$

$$-0.5 < MS/M3 < 0.9$$

where MS denotes a moving distance of the aperture stop in an optical-axis direction, M3 denotes a moving distance of the third lens unit in the optical-axis direction, f2 denotes a focal length of the second lens unit, and f3 denotes a focal length of the third lens unit, each moving distance being given a positive sign if the movement is directed towards the image side or a negative sign if the movement is directed towards the object side.

According to the present invention, a compact zoom lens system with high optical performance over the entire zoom range can be provided.

Further features of the present invention will become apparent from the following description of exemplary embodiments with reference to the attached drawings.

BRIEF DESCRIPTION OF THE DRAWINGS

FIGS. 2A, 2B, and 2C are aberration diagrams of a first numerical example corresponding to the first embodiment of the present invention.

FIGS. 4A, 4B, and 4C are aberration diagrams of a second numerical example corresponding to the second embodiment of the present invention.

FIGS. 6A, 6B, and 6C are aberration diagrams of a third numerical example corresponding to the third embodiment of the present invention.

FIGS. 8A, 8B, and 8C are aberration diagrams of a fourth numerical example corresponding to the fourth embodiment of the present invention.

DESCRIPTION OF THE EMBODIMENTS

Exemplary embodiments of a zoom lens system and an image pickup apparatus equipped with the zoom lens system according to the present invention will be described below.

A zoom lens system according to an exemplary embodiment of the present invention includes a first lens unit having positive refractive power, a second lens unit having negative refractive power, an aperture stop, a third lens unit having positive refractive power, and a fourth lens unit having positive refractive power, which are arranged in that order from an object side towards an image side. The zoom lens system performs zooming by moving the lens units.

When performing zooming from a wide-angle end to a telephoto end, the first lens unit moves along a locus convex towards the image side. The aperture stop moves independently of the neighboring lens units.

Figure 1:
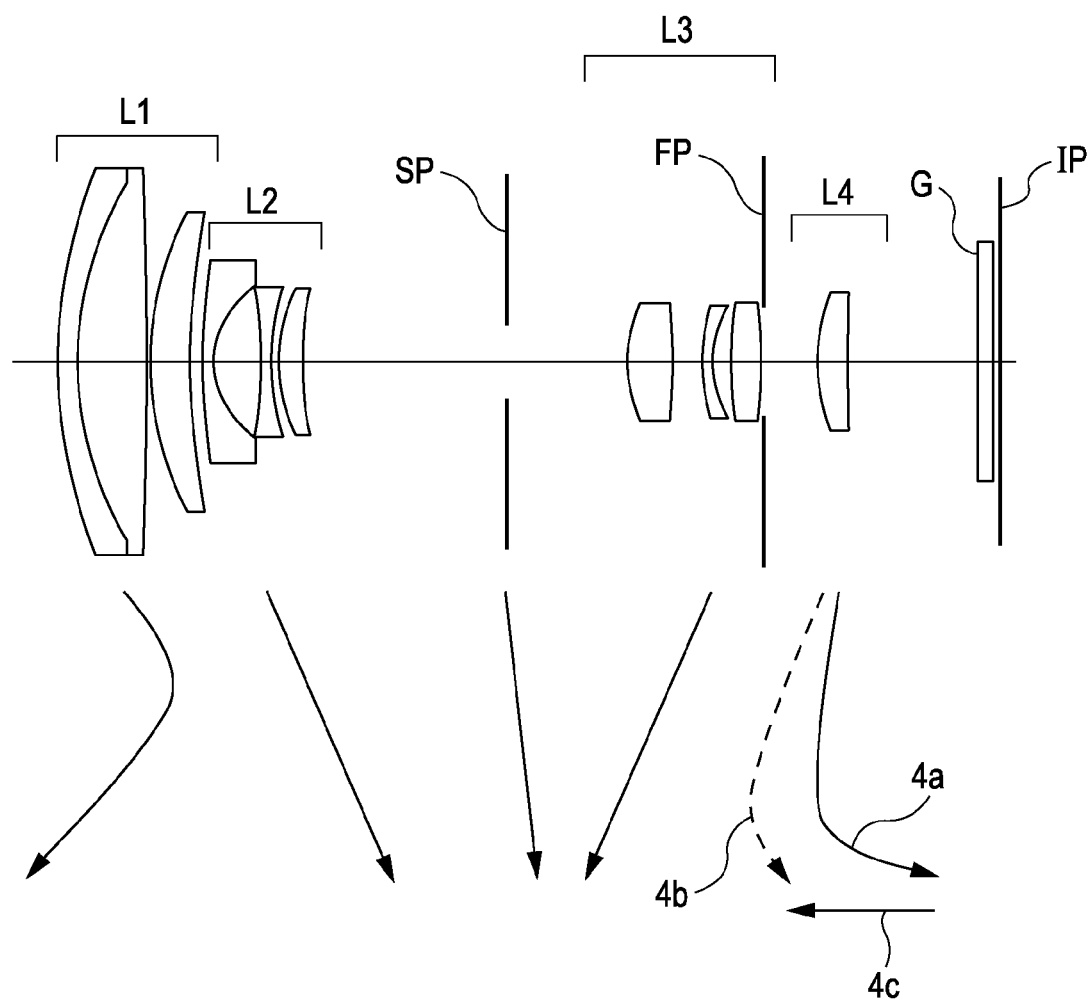
FIG. 1 is a cross-sectional view of a zoom lens system according to a first embodiment of the present invention at a wide-angle end.

FIG. 1 is a cross-sectional view of a zoom lens system according to a first embodiment of the present invention at a wide-angle end (short focal-length end). FIGS. 2A, 2B, and 2C are aberration diagrams of the zoom lens system according to the first embodiment at a wide-angle end, an intermediate zoom position, and a telephoto end (long focal-length end), respectively.

Figure 3:
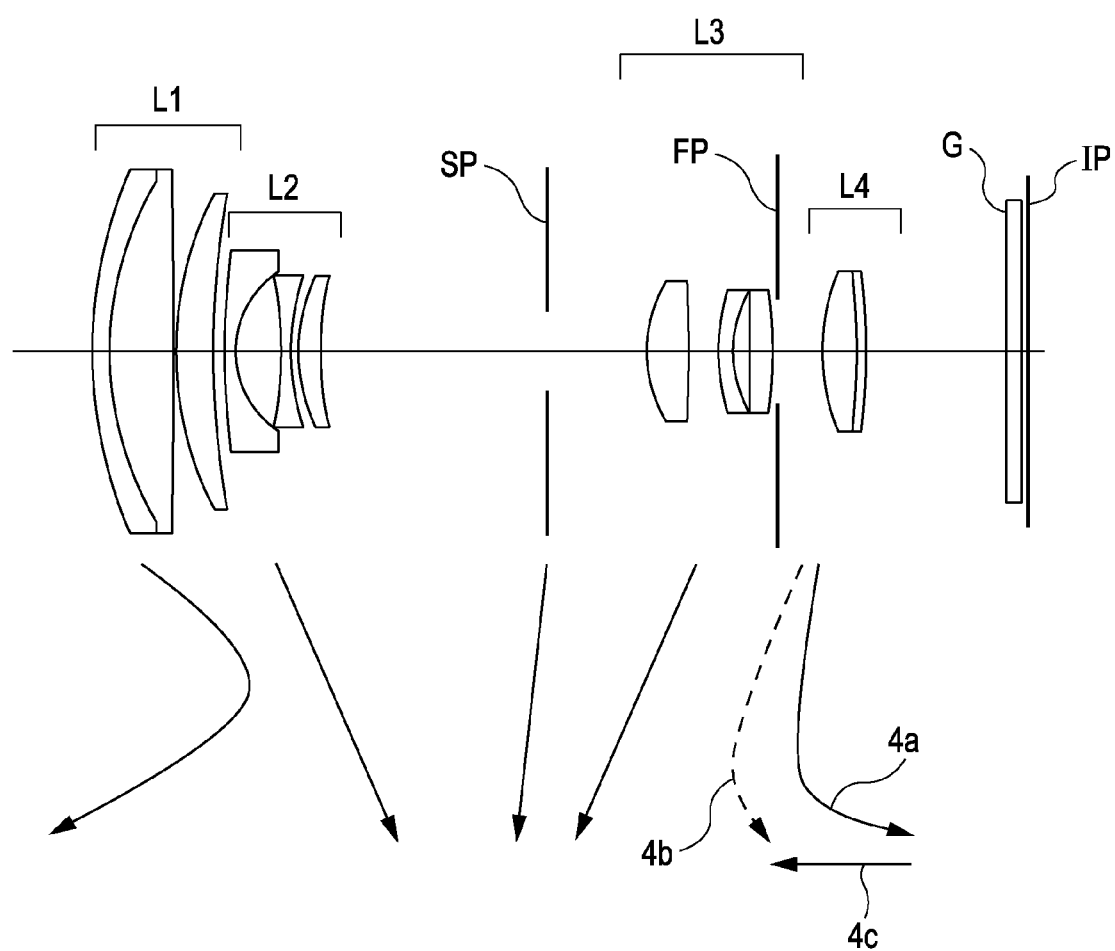
FIG. 3 is a cross-sectional view of a zoom lens system according to a second embodiment of the present invention at a wide-angle end.

FIG. 3 is a cross-sectional view of a zoom lens system according to a second embodiment of the present invention at a wide-angle end. FIGS. 4A, 4B, and 4C are aberration diagrams of the zoom lens system according to the second embodiment at a wide-angle end, an intermediate zoom position, and a telephoto end, respectively.

Figure 5:
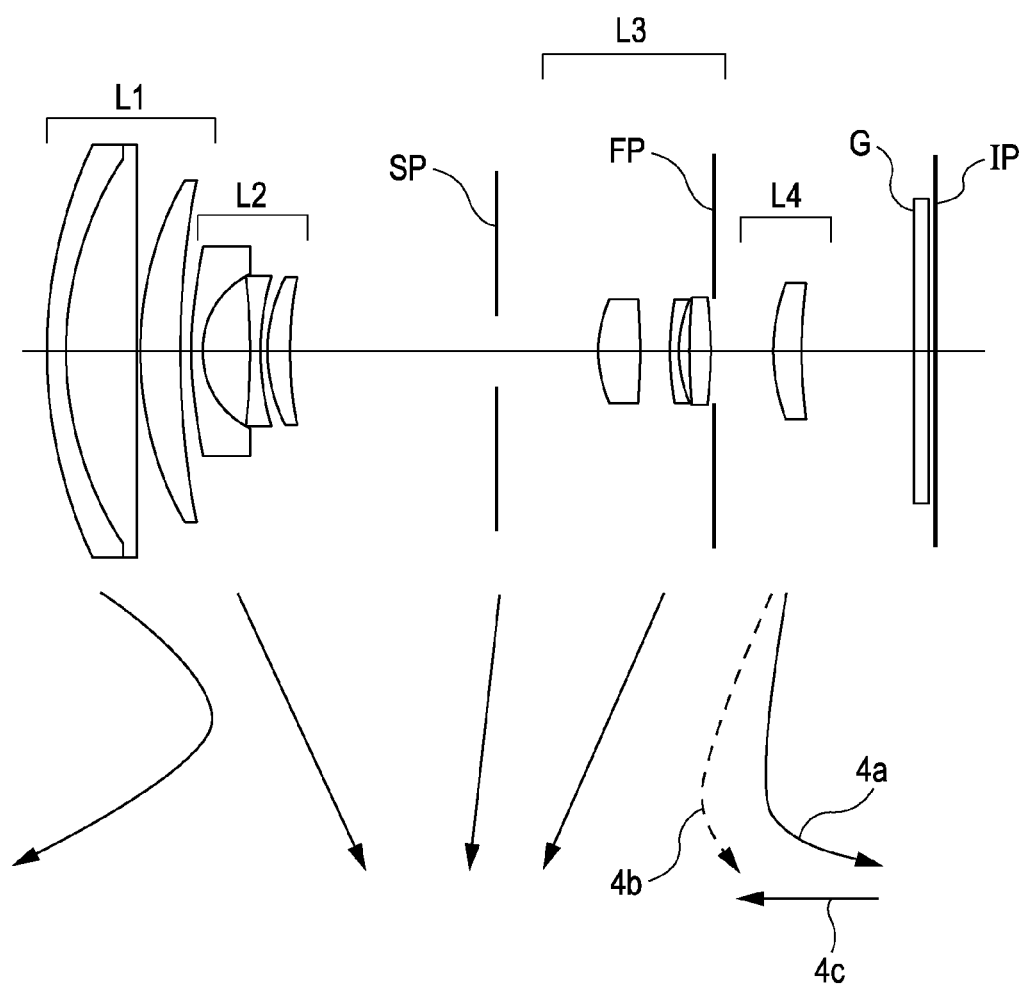
FIG. 5 is a cross-sectional view of a zoom lens system according to a third embodiment of the present invention at a wide-angle end.

FIG. 5 is a cross-sectional view of a zoom lens system according to a third embodiment of the present invention at a wide-angle end. FIGS. 6A, 6B, and 6C are aberration diagrams of the zoom lens system according to the third embodiment at a wide-angle end, an intermediate zoom position, and a telephoto end, respectively.

Figure 7:
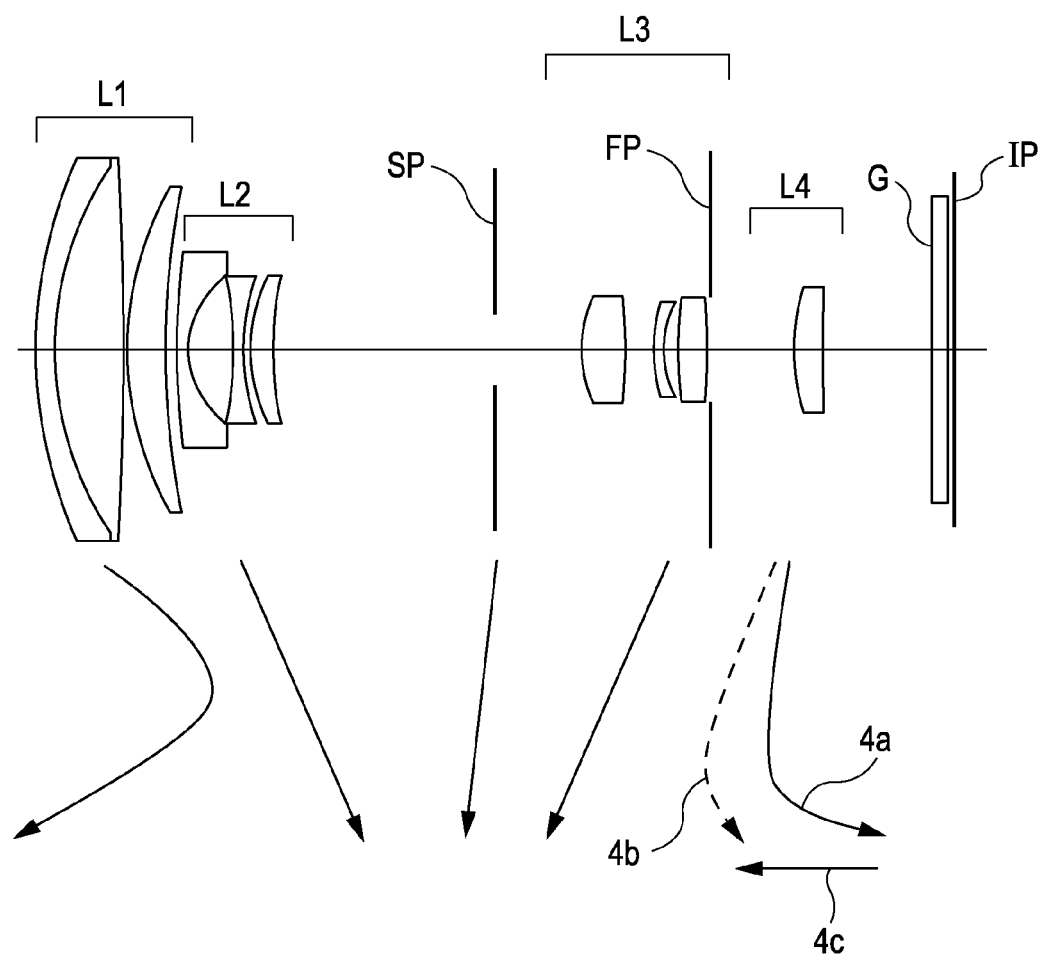
FIG. 7 is a cross-sectional view of a zoom lens system according to a fourth embodiment of the present invention at a wide-angle end.

FIG. 7 is a cross-sectional view of a zoom lens system according to a fourth embodiment of the present invention at a wide-angle end. FIGS. 8A, 8B, and 8C are aberration diagrams of the zoom lens system according to the fourth embodiment at a wide-angle end, an intermediate zoom position, and a telephoto end, respectively.

Figure 9:
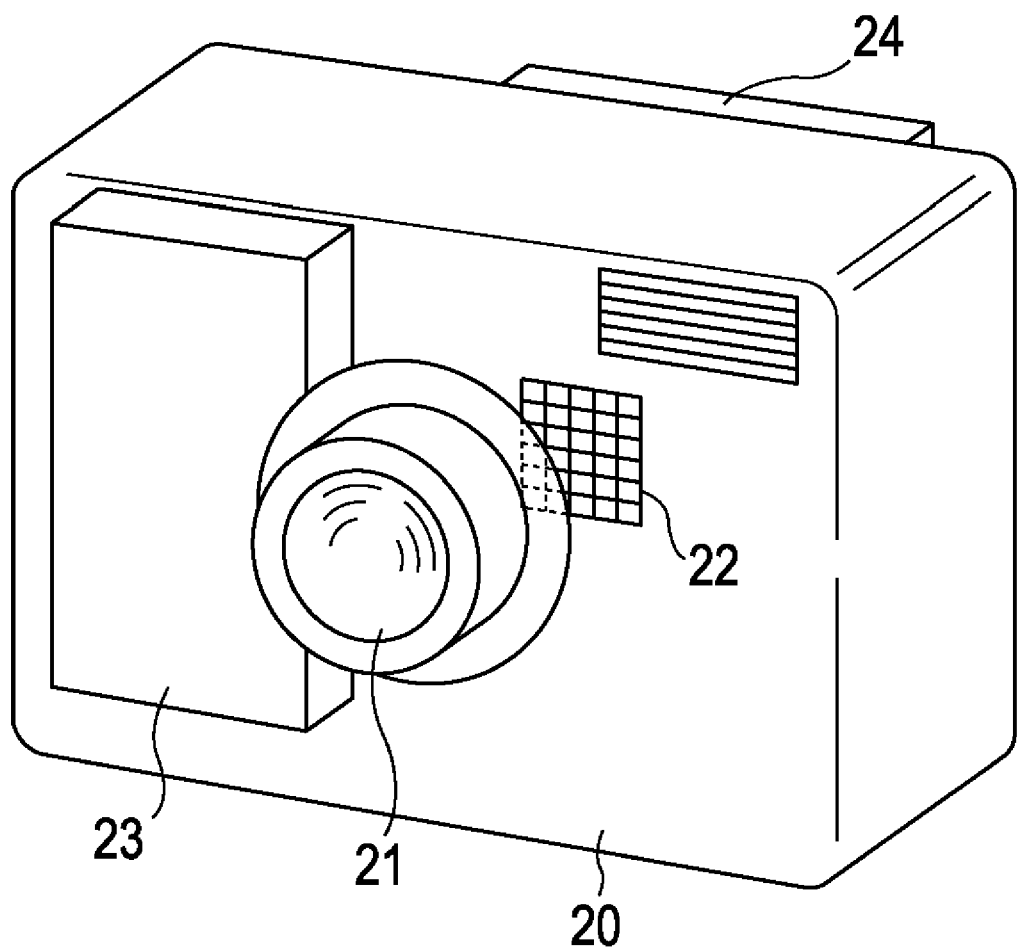
FIG. 9 schematically illustrates an image pickup apparatus according to an embodiment of the present invention.

FIG. 9 schematically illustrates a relevant part of a camera (image pickup apparatus) equipped with the zoom lens system according to any one of the embodiments of the present invention. The zoom lens system according to each embodiment can serve as an image-taking optical system used in an image pickup apparatus, such as a video camera, a digital camera, or a silver-halide film camera. In the cross-sectional diagrams, the left side is the object side (front) and the right side is the image side (rear), and i indicates the order of a lens unit counted from the object side. For example, Li is an i-th lens unit from the object side.

Referring to each cross-sectional diagram, the zoom lens system includes a first lens unit L1 having positive refractive power (optical power=reciprocal of focal length), a second lens unit L2 having negative refractive power, a third lens unit L3 having positive refractive power, and a fourth lens unit L4 having positive refractive power.

The zoom lens system also includes an aperture stop SP disposed on the object side of the third lens unit L3, and a flare-cut stop FP disposed on the image side of the third lens unit L3. The flare-cut stop FP is configured to block unnecessary light.

The zoom lens system further includes an optical block G that corresponds to, for example, an optical filter, a faceplate, a crystal optical low-pass filter, an infrared cut filter, etc.

Reference character IP denotes an image plane. When the zoom lens system is used as an image-taking optical system in a video camera or a digital still camera, the image plane IP corresponds to an image pickup area of a solid-state image pickup element (photoelectric conversion element) such as a CCD sensor or a CMOS sensor. On the other hand, when the zoom lens system is used as an image-taking optical system in a silver-halide film camera, the image plane IP is defined by a photosensitive area that corresponds to a film surface.

In the aberration diagrams, d and g respectively indicate d-line and g-line, and ΔM and ΔS respectively indicate a meridional image plane and a sagittal image plane. A chromatic aberration of magnification is expressed by g-line. Moreover, Y denotes an image height, and Fno denotes an F number.

In each of the embodiments, a wide-angle end and a telephoto end are zoom positions that correspond to opposite ends of a range within which variable-power lens units are mechanically movable on an optical axis.

In the embodiments, the lens units are configured to be moved along the corresponding arrows for zooming from the wide-angle end to the telephoto end.

Specifically, when performing zooming from the wide-angle end to the telephoto end in each embodiment, the first lens unit L1 is moved along a locus that is convex towards the image side, as shown with an arrow. In addition, the second lens unit L2 is moved towards the image side, the third lens unit L3 is moved towards the object side, and the fourth lens unit L4 is moved along a locus convex towards the object side.

When zooming is performed, the first lens unit L1 and the third lens unit L3 are configured to be moved towards the object side so that their positions at the telephoto end are closer towards the object side as compared to their positions at the wide-angle end. Thus, a high zoom ratio can be achieved while keeping the overall length of the zoom lens system at the wide-angle end to a small value.

In particular, since the third lens unit L3 in each of the embodiments is configured to be moved towards the object side during zooming, the third lens unit L3 plays a part of the magnification variation. Furthermore, moving the first lens unit L1 having positive refractive power towards the object side gives the second lens unit L2 a large zooming effect, so that a high zoom ratio of about 10× can be achieved without having to increase the refractive powers of the first lens unit L1 and the second lens unit L2 by a large degree.

The zoom lens system is of a rear-focus type in which focusing is performed by moving the fourth lens unit L4 on the optical axis.

When performing focusing from an object at infinity to a near object at the telephoto end, the fourth lens unit L4 is moved forward as shown with an arrow 4c in the cross-sectional diagrams. A solid curve 4a represents a locus of the fourth lens unit L4 for correcting an image-plane variation occurring as a result of zooming from the wide-angle end to the telephoto end when an object at infinity is in focus. A dashed curve 4b represents a locus of the fourth lens unit L4 for correcting an image-plane variation occurring as a result of zooming from the wide-angle end to the telephoto end when a near object is in focus.

In the embodiments, the lightweight fourth lens unit L4 is configured to be moved for focusing so as to allow for a quick focusing operation, more specifically, to facilitate, for example, an automatic focus detection.

In the embodiments, the third lens unit L3 is moved such that it has a vector component in a direction orthogonal to the optical axis. This movement of the third lens unit L3 corrects an image blur occurring as a result of vibration of the entire optical system. In other words, image stabilization can be implemented by displacing the position of the image in the orthogonal direction.

This implies that image-blur correction can be implemented without the need for an additional optical member such as a vari-angle prism or an additional lens unit for image stabilization, thereby preventing the entire optical system from being large in size.

During zooming, the aperture stop SP moves independently of the lens units.

The lens units and the aperture stop SP are configured to be moved such that the distance between the second lens unit L2 and the aperture stop SP and the distance between the aperture stop SP and the third lens unit L3 are both shorter at the telephoto end than at the wide-angle end.

This configuration minimizes a drastic fall-off in the marginal illumination from a range corresponding to 80% of the image height at the wide-angle end or at zoom positions near the wide-angle end.

Because the first lens unit L1 has a large effective lens diameter, it is preferable that the first lens unit L1 can have a small number of lens elements to achieve lightweightness. In view of aberration correction, it is preferable that the first lens unit L1 includes a negative lens element and a positive lens element that are arranged in that order from the object side towards the image side.

Specifically, in the embodiments, the first lens unit L1 has a total of three lens elements divided into two groups, one group including a cemented lens consisting of a single positive lens element and a single negative lens element, the other group including a positive lens element. With this configuration, spherical aberration and chromatic aberration occurring due to a high zoom ratio can be reduced.

The second lens unit L2 includes three independent lens elements, which are a negative meniscus lens element having a convex surface facing towards the object side, a negative biconcave lens element, and a positive lens element having a convex surface facing towards the object side.

This configuration reduces variations in the aberrations during zooming, and particularly, allows for proper correction of distortion at the wide-angle end and spherical aberration at the telephoto end.

The third lens unit L3 includes two positive lens elements and a negative lens element having a concave surface facing towards the image side.

Specifically, the third lens unit L3 includes three independent lens elements, which are a positive biconvex lens element, a negative meniscus lens element having a concave surface facing towards the image side, and a positive lens element arranged in that order from the object side towards the image side.

This configuration mainly allows for proper correction of spherical aberration and coma aberration at the telephoto end.

The third lens unit L3 has one or more aspherical surfaces so as to properly correct variations in the aberrations during zooming.

The fourth lens unit L4 includes either a single positive lens element having a convex surface facing towards the object side or a cemented lens consisting of a positive lens element and a negative lens element.

The moving distances (maximum moving distances) of the aperture stop SP and the third lens unit L3 in the optical-axis direction for zooming from the wide-angle end to the telephoto end will be respectively represented by MS and M3 (each moving distance being given a positive sign if the movement is directed towards the image side or given a negative sign if the movement is directed towards the object side).

The moving distance MS is defined as an amount of difference between an optical-axis position of the aperture stop SP at the wide-angle end with respect to the image plane and an optical-axis position of the aperture stop SP at the telephoto end with respect to the image plane.

If the focal lengths of the second lens unit L2 and the third lens unit L3 are represented by f2 and f3, respectively, the following conditions are satisfied:

$$-0.6 < f2/f3 < -0.4 \quad (1)$$

$$-0.5 < MS/M3 < 0.9 \quad (2)$$

The technical meaning of these conditional expressions will be described below.

The conditional expression (1) is for setting an appropriate ratio between the focal lengths of the third lens unit L3 and the second lens unit L2 that contribute to magnification variation, in order to reduce the size of the entire system and to maintain the optical performance at a high level when image stabilization is being performed by the third lens unit L3.

If the ratio falls below the lower limit of the conditional expression (1) and the negative optical power (refractive power) of the second lens unit L2 is lowered, it becomes difficult to reduce the overall lens length (i.e. the length from the first lens surface to the image plane) and also to reduce the front lens diameter. Furthermore, since the third lens unit L3 will have a greater load for the magnification variation to achieve a high zoom ratio, a coma aberration, for example, can often occur when an image blur is being corrected by moving the third lens unit L3 in the direction orthogonal to the optical axis. This results in reduced optical performance.

In contrast, if the ratio exceeds the upper limit and the optical power of the second lens unit L2 is increased, the sensitivity becomes high. This makes it difficult to give the lens system a collapsible structure for compactness and also to correct the aberrations over the entire zoom range, the aberrations including curvature of field and astigmatism.

The conditional expression (2) is for minimizing a drastic fall-off in the marginal illumination at the wide-angle end or at zoom positions near the wide-angle end, and also for setting an appropriate ratio between the moving distance MS of the aperture stop SP and the moving distance M3 of the third lens unit L3 for zooming from the wide-angle end to the telephoto end in order to reduce the front lens diameter.

If the ratio falls below the lower limit of the conditional expression (2) and the moving distance MS of the aperture stop SP is reduced, the F number Fno at the telephoto end unfavorably becomes higher.

In contrast, if the ratio exceeds the upper limit of the conditional expression (2), the absolute quantity of marginal light at the wide-angle end and at zoom positions near the wide-angle end becomes insufficient in the peripheral region of the screen. In that case, a sufficient improvement in the marginal illumination becomes difficult to achieve.

To further enhance the aberration correction capability, to further reduce variations in the aberrations during zooming, and to further reduce the size of the entire lens system in the embodiments, it is preferable that the numerical ranges of the conditional expressions (1) and (2) be set as follows:

$$-0.55 < f2/f3 < -0.4 \quad (1a)$$

$$-0.25 < MS/M3 < 0.7 \quad (2a)$$

With the above lens configuration in the embodiments, the entire lens system can be made compact while still having a high zoom ratio.

Particularly, in addition to the reduction of the overall lens length and the front lens diameter, the fall-off in the marginal illumination at the peripheral region of the screen is minimized. Accordingly, a zoom lens system with high optical performance over the entire zoom range from the wide-angle end to the telephoto end can be achieved.

In the embodiments, if at least one of the following conditional expressions is additionally satisfied, an advantage corresponding to that conditional expression can be achieved.

In the following conditional expressions, the moving distance of the second lens unit L2 in the optical-axis direction for zooming from the wide-angle end to the telephoto end is represented by M2, and the focal lengths of the first lens unit L1 and the fourth lens unit L4 are respectively represented by f1 and f4.

Moreover, the distance between the aperture stop SP and the third lens unit L3 at the wide-angle end is represented by dsw, and the focal length of the zoom lens system at the wide-angle end is represented by fw.

In this case, at least one of the following conditions may be satisfied:

$$-5.0 < M2/M3 < 0 \quad (3)$$

$$1.0 < f1/f4 < 2.1 \quad (4)$$

$$0.6 < dsw/fw < 1.7 \quad (5)$$

In the embodiments, when one of the above conditional expressions is satisfied, an advantage corresponding to that conditional expression is achieved.

The technical meaning of these conditional expressions will be described below.

The conditional expression (3) is for setting an appropriate ratio between the moving distances of the second lens unit L2 and the third lens unit L3 for zooming in order to reduce the overall length (i.e. the length from the first lens surface to the image plane) and to reduce the front lens diameter.

If the ratio falls below the lower limit of the conditional expression (3) and the moving distance M2 of the second lens unit L2 becomes greater than the moving distance M3 of the third lens unit L3, it becomes necessary to ensure a space corresponding to the moving distance M2 inside the lens barrel. This implies that the overall length becomes greater. If the optical power of the second lens unit L2 is increased to attain a high zoom ratio, the sensitivity with respect to parallelism and inclination (tilting) during zooming becomes higher, thus making it difficult to give the lens system a collapsible structure.

In contrast, if the ratio exceeds the upper limit of the conditional expression (3) and the moving direction becomes the same between the second lens unit L2 and the third lens unit L3, the moving distance of the third lens unit L3 for zooming from the wide-angle end to the telephoto end will need to be increased for attaining a high zoom ratio, thus resulting in an increase in the overall length.

If the optical power of the third lens unit L3 is increased to attain a high zoom ratio, the sensitivity with respect to parallelism and tilting of the third lens unit L3 becomes higher. Thus, when an image blur is to be corrected by moving the third lens unit L3 in the direction orthogonal to the optical axis, the optical performance will deteriorate.

The conditional expression (4) is for setting an appropriate ratio between the focal lengths of the first lens unit L1 and the fourth lens unit L4 in order to reduce the overall length, to reduce the front lens diameter, and to achieve compactness of the entire lens system.

If the ratio falls below the lower limit of the conditional expression (4) and the optical power of the first lens unit L1 is increased, the positive lens element included in the first lens unit L1 will have reduced edge thickness. This leads to a difficult manufacturing process. On the other hand, if the thickness of the positive lens element is increased to satisfy the manufacturing conditions, the front lens diameter will become larger, making it difficult to achieve compactness of the entire lens system.

In contrast, if the ratio exceeds the upper limit, the moving distance of the fourth lens unit L4 becomes longer, resulting in an increase in the overall length. This will make it difficult to achieve compactness of the entire lens system.

The conditional expression (5) is for setting an appropriate distance dsw between the aperture stop SP and the third lens unit L3 at the wide-angle end in order to reduce the front lens diameter and to achieve compactness of the entire lens system.

If the ratio falls below the lower limit of the conditional expression (5) and the distance dsw between the aperture stop SP and the third lens unit L3 becomes shorter, it becomes difficult to implement shading on a light ray in the middle of the image height of the screen, thus making it difficult to achieve an improvement in the marginal illumination.

In contrast, if the ratio exceeds the upper limit in the conditional expression (5), the marginal illumination at the maximum image height becomes undesirably shaded by the aperture stop, causing a significant fall-off in the marginal illumination at the peripheral region of the screen. As a result, the absolute quantity of marginal light becomes insufficient in the peripheral region of the screen, thus making it difficult to achieve an improvement in the marginal illumination.

To further enhance the aberration correction capability, to further reduce variations in the aberrations during zooming, and to further reduce the size of the entire lens system in the embodiments, it is preferable that the numerical ranges of the conditional expressions (3) to (5) be set as follows:

$$-4.0<M2/M3<0 \tag{3a}$$

$$1.1<f1/f4<2.1 \tag{4a}$$

$$0.7<dsw/fw<1.5 \tag{5a}$$

According to the embodiments, the moving distances of the lens units and the aperture stop SP for zooming and the refractive powers of the lens units are set to appropriate values, whereby the front lens diameter can be reduced, the overall lens length can be reduced, and the entire lens system can be made compact while still achieving a high zoom ratio.

In particular, a zoom lens system having high optical performance over the entire zoom range from the wide-angle end to the telephoto end can be achieved.

In addition to having high optical performance over the entire zoom range from the wide-angle end to the telephoto end, the zoom lens system can minimize a drastic fall-off in the quantity of light at the peripheral region of the screen when the zoom lens system is at the wide-angle end or at zoom positions near the wide-angle end.

Next, first to fourth numerical examples corresponding to the first to fourth embodiments of the present invention will be described. In the numerical examples, i indicates the order of an optical surface counted from the object side, ri indicates a curvature radius of an i-th optical surface (i-th surface), di indicates the distance between an i-th surface and an (i+1)th surface, and ni and vi respectively indicate the refractive index and the Abbe number of the material constituting the i-th optical member with respect to d-line.

The shape of an aspheric surface is expressed as follows:

$$x=(h2/R)/[1+[1-(1+k)(h/R)2]1/2]+Bh^4+Ch^6+Dh^8+Eh^{10}$$

where k denotes the eccentricity, B, C, D, and E denote aspherical coefficients, and x denotes the displacement from the vertex of the aspheric surface in the optical-axis direction at a height of h from the optical axis. In this case, R denotes a curvature radius, and "E-Z" represents "10-Z". Moreover, f denotes a focal length, Fno denotes an F number, and ω denotes a half angle of view.

The last two surfaces in each numerical example are surfaces of the optical block, such as a filter or a faceplate.

The relationships between the numerical examples and the conditional expressions mentioned above are shown in Table 1.

| | FIRST NUMERICAL EXAMPLE SURFACE DATA | | | |
|---|---|---|---|---|
| | SURFACE NUMBER | | | |
| OBJECT SURFACE | r ∞ | d ∞ | nd | vd |
| 1 | 34.10600 | 1.300000 | 1.846660 | 23.9 |
| 2 | 23.55700 | 4.600000 | 1.487490 | 70.2 |
| 3 | −220.94500 | 0.200000 | | |
| 4 | 20.96700 | 2.700000 | 1.487490 | 70.2 |
| 5 | 51.63600 | VARIABLE | | |
| 6 | 48.31600 | 0.800000 | 1.834807 | 42.7 |
| 7 | 6.12100 | 3.100000 | | |
| 8 | −27.74300 | 0.700000 | 1.603112 | 60.6 |
| 9 | 15.84900 | 0.500000 | | |
| 10 | 11.07100 | 1.600000 | 1.922860 | 18.9 |
| 11 | 27.18600 | VARIABLE | | |
| 12 | (STOP) ∞ | VARIABLE | | |
| 13* | 8.694 | 3.000000 | 1.583126 | 59.4 |
| 14 | −44.66300 | 2.070000 | | |
| 15 | 13.00600 | 0.700000 | 1.922860 | 18.9 |
| 16 | 7.38800 | 1.200000 | | |
| 17 | 29.86300 | 2.000000 | 1.487490 | 70.2 |
| 18 | −37.08900 | 0.200000 | | |
| 19 | (FLARE STOP) ∞ | VARIABLE | | |
| 20 | 13.41400 | 2.000000 | 1.487490 | 70.2 |
| 21 | 117.60900 | VARIABLE | | |
| 22 | ∞ | 1.000000 | 1.516330 | 64.1 |

-continued

| | |
|---|---|
| 23 | ∞ |

ASPHERIC-SURFACE DATA

13$^{TH}$ SURFACE
K = −9.310444E−01
B = −3.423205E−05
C = −6.262213E−07
D = 1.482174E−08
E = 5.602027E−10

VARIOUS DATA

ZOOM RATIO 9.99850

| | zoom 1 | zoom 2 | zoom 3 |
|---|---|---|---|
| FOCAL LENGTH | 6.1005 | 7.5637 | 60.9959 |
| Fno | 2.87759 | 3.23235 | 4.76530 |
| ANGLE OF VIEW | 60.6721 | 50.5335 | 6.6992 |
| IMAGE HEIGHT | 7.14 | 7.14 | 7.14 |
| OVERALL LENS LENGTH | 52.6009 | 51.3258 | 67.2400 |
| BF | 9.68844 | 10.17585 | 6.68393 |
| d5 | 0.800000 | 1.61547 | 22.11860 |
| d11 | 13.52229 | 11.61222 | 1.99739 |
| d12 | 8.00000 | 6.11514 | 1.47215 |
| d19 | 3.61087 | 5.31518 | 14.98408 |
| d21 | 8.52896 | 9.01636 | 5.52445 |

ZOOM-LENS UNIT DATA

| LENS UNIT | FIRST SURFACE | FOCAL LENGTH |
|---|---|---|
| 1 | 1 | 38.997558 |
| 2 | 6 | −7.777615 |
| 3 | 13 | 15.892001 |
| 4 | 20 | 30.865222 |

SECOND NUMERICAL EXAMPLE
SURFACE DATA

SURFACE NUMBER

| OBJECT SURFACE | | r<br>∞ | d<br>∞ | nd | vd |
|---|---|---|---|---|---|
| | 1 | 32.52751 | 1.200000 | 1.846660 | 23.9 |
| | 2 | 23.43696 | 4.500000 | 1.487490 | 70.2 |
| | 3 | −430.21580 | 0.200000 | | |
| | 4 | 24.46623 | 2.600000 | 1.487490 | 70.2 |
| | 5 | 60.10821 | VARIABLE | | |
| | 6 | 53.20140 | 0.800000 | 1.834807 | 42.7 |
| | 7 | 6.66236 | 3.200000 | | |
| | 8 | −30.44403 | 0.700000 | 1.603112 | 60.6 |
| | 9 | 16.84399 | 0.500000 | | |
| | 10 | 11.61205 | 1.600000 | 1.922860 | 18.9 |
| | 11 | 27.60516 | 15.982190 | | |
| | 12 | (STOP) ∞ | VARIABLE | | |
| | 13* | 8.77605 | VARIABLE | 1.583126 | 59.4 |
| | 14 | −74.01995 | 2.051940 | | |
| | 15 | 15.20621 | 1.000000 | 1.922860 | 18.9 |
| | 16 | 7.81972 | 1.200000 | | |
| | 17 | −252.99340 | 1.600000 | 1.804000 | 46.6 |
| | 18 | −30.34429 | 0.200000 | | |
| | 19 | (FLARE STOP) ∞ | VARIABLE | | |
| | 20 | 14.41741 | 2.500000 | 1.516330 | 64.1 |
| | 21 | −40.97417 | 0.600000 | 1.846660 | 23.9 |
| | 22 | −54.44938 | VARIABLE | | |
| | 23 | ∞ | 1.000000 | 1.516330 | 64.1 |
| | 24 | ∞ | | | |

ASPHERIC-SURFACE DATA

13$^{TH}$ SURFACE
K = −9.788539E−01
B = −9.072260E−06
C = −3.590430E−07
D = 1.149926E−08
E = 5.602027E−10

-continued

VARIOUS DATA

ZOOM RATIO 10.03733

|  | zoom 1 | zoom 2 | zoom 3 |
|---|---|---|---|
| FOCAL LENGTH | 6.2826 | 8.7885 | 63.0606 |
| Fno | 2.88193 | 3.38019 | 4.07895 |
| ANGLE OF VIEW | 59.2136 | 44.2153 | 6.4804 |
| IMAGE HEIGHT | 7.14 | 7.14 | 7.14 |
| OVERALL LENS LENGTH | 54.5499 | 52.0883 | 70.8419 |
| BF | 11.04302 | 12.64012 | 8.93335 |
| d5 | 0.80000 | 3.37278 | 24.92380 |
| d11 | 15.98219 | 13.12384 | 1.47958 |
| d12 | 7.00000 | 3.72388 | 2.97905 |
| d19 | 3.31574 | 4.41583 | 14.00750 |
| d21 | 9.88353 | 11.48063 | 7.77386 |

ZOOM-LENS UNIT DATA

| LENS UNIT | FIRST SURFACE | FOCAL LENGTH |
|---|---|---|
| 1 | 1 | 42.242841 |
| 2 | 6 | −8.433433 |
| 3 | 13 | 19.036135 |
| 4 | 20 | 23.410540 |

THIRD NUMERICAL EXAMPLE
SURFACE DATA

SURFACE NUMBER

| OBJECT SURFACE | | r | d | nd | νd |
|---|---|---|---|---|---|
| | | ∞ | ∞ | | |
| | 1 | 33.68873 | 1.300000 | 1.846660 | 23.9 |
| | 2 | 24.06195 | 5.000000 | 1.487490 | 70.2 |
| | 3 | 8037.77455 | 0.200000 | | |
| | 4 | 23.70988 | 2.800000 | 1.487490 | 70.2 |
| | 5 | 64.41930 | 0.800000 | | |
| | 6 | 34.11453 | 0.800000 | 1.834807 | 42.7 |
| | 7 | 5.94226 | 3.300000 | | |
| | 8 | −25.19164 | 0.700000 | 1.603112 | 60.6 |
| | 9 | 16.01100 | 0.500000 | | |
| | 10 | 11.05786 | 1.600000 | 1.922860 | 18.9 |
| | 11 | 26.49056 | 14.423280 | | |
| | 12 | (STOP) ∞ | VARIABLE | | |
| | 13* | 8.49859 | 3.000000 | 1.583126 | 59.4 |
| | 14 | −50.39617 | 2.051940 | | |
| | 15 | 18.40678 | 0.600000 | 1.922860 | 18.9 |
| | 16 | 8.31419 | 0.800000 | | |
| | 17 | 43.94210 | 1.500000 | 1.804000 | 46.6 |
| | 18 | −29.67485 | 0.200000 | | |
| | 19 | (FLARE STOP) ∞ | VARIABLE | | |
| | 20 | 12.94758 | 2.000000 | 1.516330 | 64.1 |
| | 21 | 41.14810 | VARIABLE | | |
| | 22 | ∞ | 1.000000 | 1.516330 | 64.1 |
| | 23 | ∞ | | | |

ASPHERIC-SURFACE DATA $13^{TH}$ SURFACE $K = -9.723155E-01$
$B = -3.766818E-05$
$C = 1.057662E-07$
$D = -1.105825E-08$
$E = 5.602027E-10$

VARIOUS DATA

ZOOM RATIO 9.80572

|  | zoom 1 | zoom 2 | zoom 3 |
|---|---|---|---|
| FOCAL LENGTH | 5.6064 | 10.6245 | 54.9748 |
| Fno | 2.88866 | 4.05515 | 4.19655 |
| ANGLE OF VIEW | 64.9757 | 37.1464 | 7.4310 |
| IMAGE HEIGHT | 7.14 | 7.14 | 7.14 |
| OVERALL LENS LENGTH | 52.6865 | 49.0978 | 71.5194 |
| BF | 8.91842 | 11.71144 | 5.06162 |
| d5 | 0.80000 | 5.20003 | 25.03559 |
| d11 | 14.42328 | 10.38148 | 0.88816 |

-continued

| | | | |
|---|---|---|---|
| d12 | 7.00000 | 1.13734 | 3.92442 |
| d19 | 4.11128 | 6.02701 | 15.31932 |
| d21 | 7.75894 | 10.55196 | 3.90213 |

ZOOM-LENS UNIT DATA

| LENS UNIT | FIRST SURFACE | FOCAL LENGTH |
|---|---|---|
| 1 | 1 | 43.260646 |
| 2 | 6 | −7.763555 |
| 3 | 13 | 14.821872 |
| 4 | 20 | 35.726500 |

FOURTH NUMERICAL EXAMPLE
SURFACE DATA

SURFACE NUMBER

| | | r | d | nd | νd |
|---|---|---|---|---|---|
| OBJECT SURFACE | | ∞ | ∞ | | |
| | 1 | 32.38614 | 1.300000 | 1.846660 | 23.9 |
| | 2 | 22.66733 | 4.800000 | 1.487490 | 70.2 |
| | 3 | −264.67174 | 0.200000 | | |
| | 4 | 22.41568 | 2.700000 | 1.487490 | 70.2 |
| | 5 | 56.03390 | 0.800000 | | |
| | 6 | 60.00462 | 0.800000 | 1.834807 | 42.7 |
| | 7 | 6.34839 | 3.100000 | | |
| | 8 | −29.07278 | 0.700000 | 1.603112 | 60.6 |
| | 9 | 14.90125 | 0.500000 | | |
| | 10 | 11.10015 | 1.600000 | 1.922860 | 18.9 |
| | 11 | 27.18557 | 15.319860 | | |
| | 12 | (STOP) ∞ | VARIABLE | | |
| | 13* | 8.69475 | 3.000000 | 1.583126 | 59.4 |
| | 14 | −43.17763 | 2.067770 | | |
| | 15 | 12.77803 | 0.700000 | 1.922860 | 18.9 |
| | 16 | 7.31032 | 1.000000 | | |
| | 17 | 25.56426 | 2.000000 | 1.487490 | 70.2 |
| | 18 | −46.07637 | 0.200000 | | |
| | 19 | (FLARE STOP) ∞ | VARIABLE | | |
| | 20 | 13.76184 | 2.000000 | 1.487490 | 70.2 |
| | 21 | 117.60922 | VARIABLE | | |
| | 22 | ∞ | 1.000000 | 1.516330 | 64.1 |
| | 23 | ∞ | | | |

ASPHERIC-SURFACE DATA

13$^{TH}$ SURFACE
K = −9.310444E−01
B = −3.423205E−05
C = −6.262213E−07
D = 1.482174E−08
E = 5.602027E−10

VARIOUS DATA

ZOOM RATIO 9.99228

| | zoom 1 | zoom 2 | zoom 3 |
|---|---|---|---|
| FOCAL LENGTH | 6.4058 | 7.7365 | 64.0081 |
| Fno | 2.88550 | 3.07004 | 3.99551 |
| ANGLE OF VIEW | 58.2628 | 49.5420 | 6.3846 |
| IMAGE HEIGHT | 7.14 | 7.14 | 7.14 |
| OVERALL LENS LENGTH | 54.5771 | 53.3231 | 65.3258 |
| BF | 8.73879 | 9.51004 | 6.64613 |
| d5 | 0.80000 | 2.14644 | 23.34848 |
| d11 | 15.31986 | 12.99638 | 1.98160 |
| d12 | 6.00000 | 5.11452 | 0.98188 |
| d19 | 5.78943 | 6.39800 | 12.34611 |
| d21 | 7.57930 | 8.35055 | 5.48664 |

ZOOM-LENS UNIT DATA

| LENS UNIT | FIRST SURFACE | FOCAL LENGTH |
|---|---|---|
| 1 | 1 | 39.709363 |
| 2 | 6 | −7.709356 |
| 3 | 13 | 15.643204 |
| 4 | 20 | 31.770518 |

TABLE 1

| CONDITIONAL EXPRESSION | | FIRST EMBODIMENT | SECOND EMBODIMENT | THIRD EMBODIMENT | FOURTH EMBODIMENT |
|---|---|---|---|---|---|
| (1) | f2/f3 | −0.489404 | −0.443022 | −0.523790 | −0.492825 |
| (2) | MS/M3 | 0.219974 | 0.531467 | 0.581633 | −0.124126 |
| (3) | M2/M3 | −1.157169 | −1.158399 | −1.259590 | −3.112097 |
| (4) | f1/f4 | 1.263479 | 1.804437 | 1.210884 | 1.249881 |
| (5) | dsw/fw | 1.311366 | 1.114188 | 1.248574 | 0.936658 |

An embodiment of a digital still camera equipped with the zoom lens system according to one of the above embodiments as an image-taking optical system will now be described reference to FIG. 9.

Referring to FIG. 9, the digital still camera includes a camera body 20, an image-taking optical system 21 defined by the zoom lens system according to one of first to fourth embodiments described above, a solid-state image pickup element (photoelectric conversion element) 22 which is contained within the camera body 20 and may be, for example, a CCD sensor or a CMOS sensor that optically receives a subject image formed by the image-taking optical system 21, a memory 23 that stores information corresponding to the subject image undergone photoelectric conversion by the solid-state image pickup element 22, and a viewfinder 24 defined by a liquid crystal display panel used for viewing the subject image formed on the solid-state image pickup element 22.

By applying the zoom lens system according the embodiments of the present invention to an image pickup apparatus such as a digital still camera in this manner, a compact image pickup apparatus with high optical performance can be provided.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-185639 filed Jul. 17, 2007, which is hereby incorporated by reference herein in its entirety.

What is claimed is:

1. A zoom lens system comprising:
a first lens unit having positive refractive power;
a second lens unit having negative refractive power;
an aperture stop;
a third lens unit having positive refractive power; and
a fourth lens unit having positive refractive power, wherein the first lens unit, the second lens unit, the aperture stop, the third lens unit, and the fourth lens units are arranged in that order from an object side towards an image side, and wherein the zoom lens system is configured to perform zooming by moving the first through fourth lens units,
wherein the first lens unit is moved along a locus convex towards the image side when the zoom lens system performs zooming from a wide-angle end to a telephoto end,
wherein the aperture stop is movable independently of the first through fourth lens units, and
wherein the following conditions are satisfied:

$-0.6 < f2/f3 < -0.4$, and $-0.5 < MS/M3 < 0.9$ where MS denotes a moving distance of the aperture stop in an optical-axis direction, M3 denotes a moving distance of the third lens unit in the optical-axis direction, f2 denotes a focal length of the second lens unit, and f3 denotes a focal length of the third lens unit, each moving distance being given a positive sign if the movement is directed towards the image side or a negative sign if the movement is directed towards the object side.

2. The zoom lens system according to claim 1, wherein the following condition is satisfied:

$-5.0 < M2/M3 < 0$ where M2 denotes a moving distance of the second lens unit in the optical-axis direction for zooming from the wide-angle end to the telephoto end, and M3 denotes the moving distance of the third lens unit in the optical-axis direction for zooming from the wide-angle end to the telephoto end.

3. The zoom lens system according to claim 1, wherein the following condition is satisfied:

$1.0 < f1/f4 < 2.1$ where f1 denotes a focal length of the first lens unit and f4 denotes a focal length of the fourth lens unit.

4. The zoom lens system according to claim 1, wherein the third lens unit includes two positive lens elements and a single negative lens element.

5. The zoom lens system according to claim 1, wherein the first lens unit includes a negative lens element and a positive lens element arranged in that order from the object side towards the image side.

6. The zoom lens system according to claim 1, wherein the following condition is satisfied:

$0.6 < dsw/fw < 1.7$ where dsw denotes a distance between the aperture stop and the third lens unit at the wide-angle end, and fw denotes a focal length of the zoom lens system at the wide-angle end.

7. The zoom lens system according to claim 1, wherein an image is displaceable in a direction orthogonal to the optical axis by displacing the third lens unit in a manner such that the third lens unit has a vector component in the direction orthogonal to the optical axis.

8. The zoom lens system according to claim 1, wherein the third lens unit includes three independent lens elements, the three lens elements including a positive biconvex lens element, a negative meniscus lens element having a concave surface facing towards the image side, and a positive lens element arranged in that order from the object side towards the image side.

9. The zoom lens system according to claim 1, wherein the lens units and the aperture stop are moved such that a distance between the second lens unit and the aperture stop and a distance between the aperture stop and the third lens unit both become shorter at the telephoto end than at the wide-angle end.

10. The zoom lens system according to claim 1, wherein the zoom lens system is configured to form an image on a solid-state image pickup element.

11. An image pickup apparatus comprising:

the zoom lens system according to claim 1; and a solid-state image pickup element configured to optically receive an image formed by the zoom lens system.

\* \* \* \* \*